UNITED STATES PATENT OFFICE 2,243,707

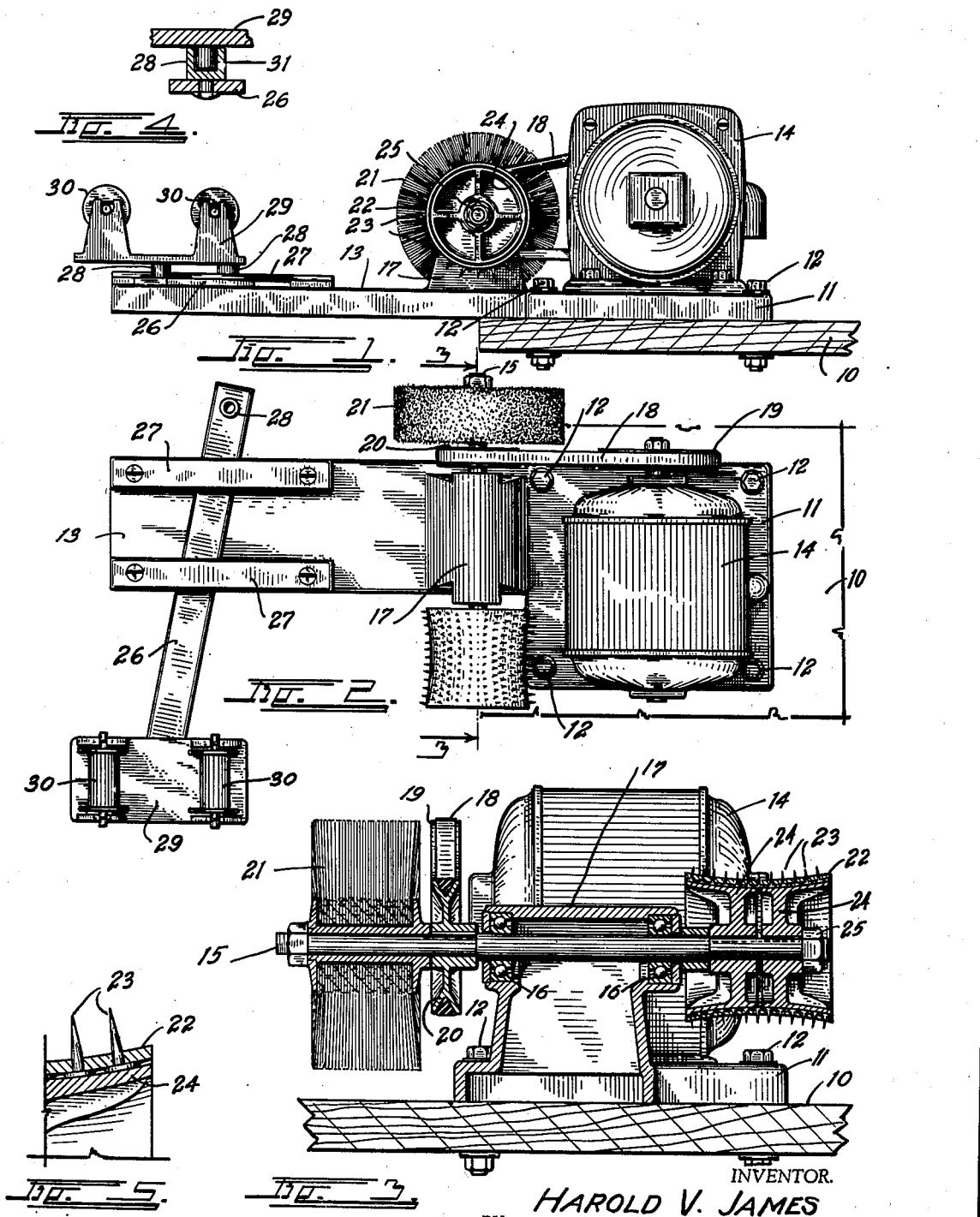

TIRE CASING BUFFER

Harold V. James, Denver, Colo.

Application February 7, 1939, Serial No. 255,042

2 Claims. (Cl. 29—76)

This invention relates to a machine for removing the tread rubber from tire casings preparatory to retreading the casing and has for its principal object a highly efficient construction which will enable the operator to rapidly and easily manipulate a heavy casing in the most efficient manner, to quickly and cleanly remove the tread rubber therefrom.

Another object of the invention is to provide an efficient toothed wheel construction for shredding the tread rubber in which the teeth can be quickly and easily removed and replaced as they become worn.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refers to like parts in all views of the drawing and throughout the description.

In the drawing:

Fig. 1 is a side elevation of the improved tread removing and buffing machine.

Fig. 2 is a plan view thereof.

Fig. 3 is a cross section through the buffing mandrel taken on the line 3—3, Fig. 2.

Fig. 4 is an enlarged detail section thru the extremity of the cross arm.

Fig. 5 is an enlarged detail section thru the edge of the shredding wheel.

The improved tread removing and buffing machine is more particularly designed to be attached to and supported on a work bench, such as indicated at 10. The entire machine is supported and assembled on a base plate 11 provided with suitable bolt openings near its one extremity for attachment, by means of suitable bolts 12, to the work bench 10. The base plate is formed with an elongated extension 13 which projects forwardly from the edge of the bench 10. An electric motor 14 is mounted on the base plate 11 to drive a buffing mandrel 15.

The buffing mandrel 15 is journalled in ball bearings 16 in a bearing post 17 formed integrally with the base 11 and its extension 13. The power from the motor is transmitted to the mandrel through the medium of a suitable V-belt 18, a V-belt drive pulley 19, and a V-belt driven pulley 20.

One extremity of the mandrel 15 supports a wire buffing wheel 21 of any of the usual standard types. The other extremity supports a shredding wheel of novel design.

The shredding wheel consists of an annular sleeve 22 having a longitudinally concave face containing a plurality of staggered perforations through which the shafts and points of a series of headed tacks 23 project. The sleeve 22 and its assembled tacks are supported on two similar convex wedge wheels 24 having a peripheral contour corresponding to the inner surface contour of the sleeve 22. The two wedge wheels 24 are splined on the shaft 15 and are faced in opposite directions within the sleeve 22. They may be drawn toward each other on the mandrel 15 by means of a clamping nut 25.

It can be readily seen that as the two wheels are drawn together the outer wheel will be wedged against the tack heads forcing the tacks outward. The movement will also act to force the sleeve 22 inwardly over the inner wedge wheel which will similarly act to force the surrounding tacks outwardly with their heads tightly clamped against the sleeve 22.

By this construction, the tightening of the single nut 25 accomplishes a variety of purposes: First, it secures the shredding wheel on the mandrel 15; second, it wedges and clamps the tacks in their perforations; and third, it positively locks the sleeve 22 in rigid relation with the wheels.

A freely mounted cross arm 26 lies on the elongated portion 13 of the base and is held thereon by means of a pair of cross straps 27. This construction allows the cross arm 26 to be slid forward and back, inward and out, and to be turned to any desired angle.

The arm cannot be withdrawn from the straps, however, due to the fact that it contains a cylindrical boss 28 adjacent each of its extremities. The bosses 28 are cupped to receive a stud 31 on a casing supporting dolly 29 carrying two curved bead rollers 30. The stud 31 can be fitted to either of the bosses 28 to rotatably position the dolly at either extremity of the cross arm 26.

In use, the operator hangs a tire casing over the rollers 30 of the dolly so that the cross arm 26 supports the entire weight of the casing. He then manipulates the casing to bring its tread opposite the shredding wheel. The rapid rotation of the latter causes the tacks 23 to tear, shred, and scrape the tread rubber from the casing. When the rubber has been removed almost to the cords or fabric the dolly 29 is moved to the other extremity of the arm 26 and the casing is brought against the buffing wheel 21 for a final buffing and cleaning.

It is desired to call attention to the fact that the cross arm 26 supports the entire weight of the casing before either of the wheels and allows the operator complete freedom to swing the casing to any desired angle and to freely rotate it as the rubber is removed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for supporting a tire casing for tread grinding machines comprising: a flat, horizontal supporting member; a pair of parallel strap members supported above and parallel with the upper surface of said supporting member; an elongated unattached cross arm lying on the latter surface beneath said straps so that it may be moved in any direction in a horizontal plane; means for preventing withdrawal of said cross arm from beneath said straps; and a casing supporting dolly rotatably mounted on the extremity of said cross arm.

2. Means for supporting a tire casing for tread grinding machines comprising: a flat, horizontal supporting member; a pair of parallel strap members supported above and parallel with the upper surface of said supporting member; an elongated unattached cross arm lying on the latter surface beneath said straps so that it may be moved in any direction in a horizontal plane; a receiving boss adjacent each extremity of said cross arm; a casing supporting dolly; and a stud formed on and projecting downwardly from said dolly so that the latter may be selectively and rotatively mounted in either receiving boss.

HAROLD V. JAMES.